June 13, 1950 W. H. WORTHINGTON 2,511,393
FOLLOW-UP CONTROL MEANS FOR HYDRAULIC MECHANISM
Filed March 23, 1944 3 Sheets-Sheet 1

*INVENTOR.*
WAYNE H. WORTHINGTON
BY
ATTORNEYS

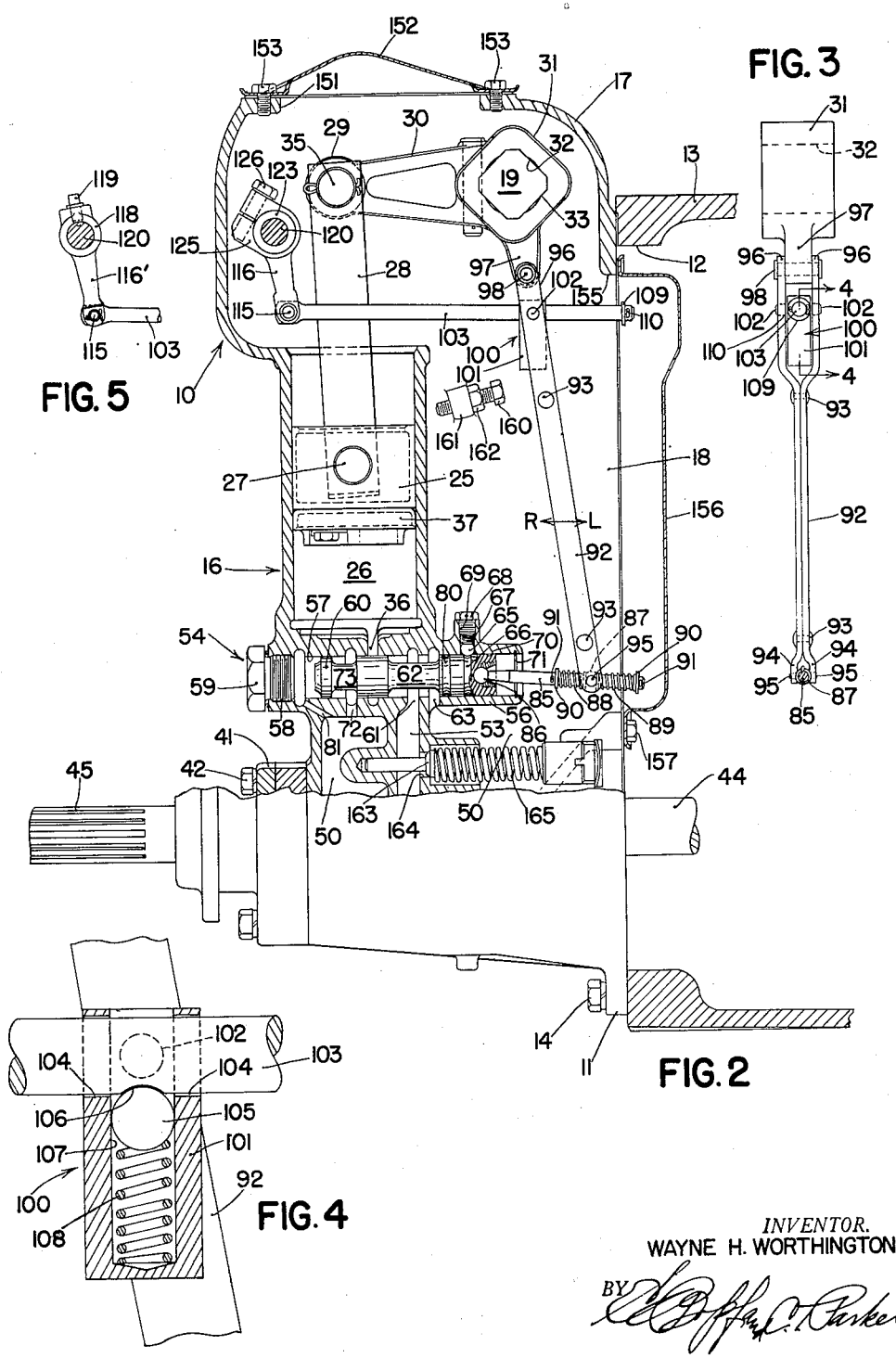

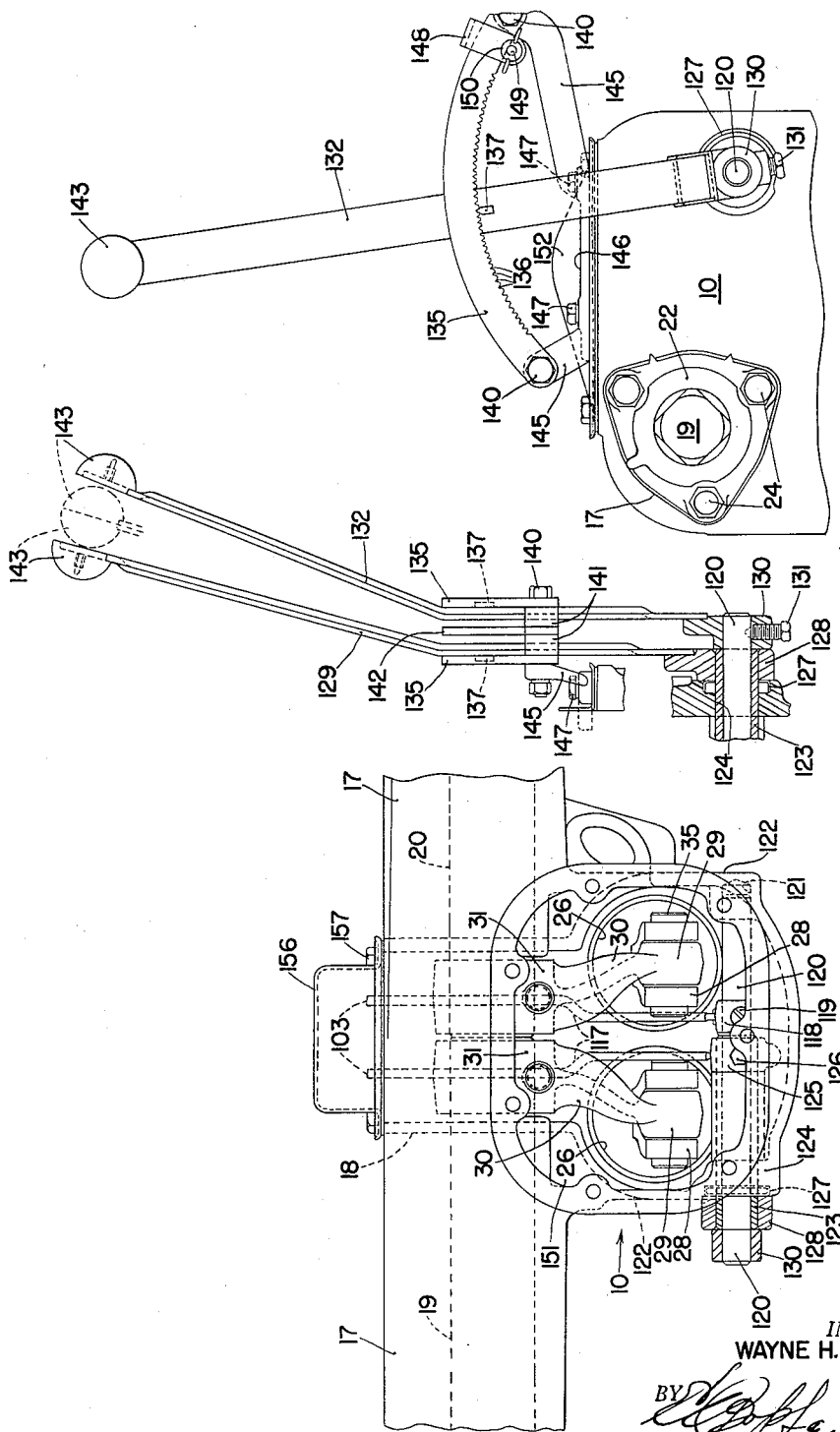

Patented June 13, 1950

2,511,393

UNITED STATES PATENT OFFICE 2,511,393

FOLLOW-UP CONTROL MEANS FOR HYDRAULIC MECHANISM

Wayne H. Worthington, Waterloo, Iowa, assignor to Deere Manufacturing Co., a corporation of Iowa Application March 23, 1944, Serial No. 527,780

8 Claims. (Cl. 121—41)

The present invention relates generally to hydraulic power mechanism, with particular reference to control mechanism for fluid motors, in which the extent of movement of the fluid motor is proportional to the extent of movement of the control element. In this class of hydraulic power mechanism, which is well-known to those skilled in the art, the operator controls the movement of the fluid motor, such as for example, a piston slidable within a cylinder, by moving a valve handle to a position which corresponds to the desired position of the piston. The piston then moves to the desired position and automatically stops. This is usually accomplished by a suitable connection between the piston and the valve by which the movement of the piston returns the valve to its original and neutral position, and generally takes the form of a differential connection between the control lever, the valve, and the piston.

One of the principal objects of the present invention relates to the provision of a hydraulic power control mechanism of this class, which is simple and compact and which operates accurately to automatically move the piston to a position which exactly corresponds to the position for which the adjustable control handle is adjusted.

It is an inherent characteristic in this type of mechanism that as the piston approaches the position for which the control is set, the valve approaches a closed position, thus throttling the fluid flow through the valve and slowing down the movement of the fluid motor. This action is cumulative, with the result that the fluid is caused to leak through the nearly closed valve for a relatively long period of time during the final seating of the valve. While this is not serious in low pressure systems, it is the cause of concentrated wear on the valve surfaces in high pressure circuits, due to the wire drawing effect, producing a considerable degree of localized friction and causing the oil or other fluid to heat and to foam.

An object of the present invention, therefore, relates to the provision of a hydraulic power mechanism in which the pump operates under working pressure only during actuation of the mechanism and in which the valve remains fully open until the fluid motor reaches its selected position, at which point the valve is closed suddenly and completely, thus eliminating any wire drawing effect. In the accomplishment of this object, I have provided a differential connection between the piston driven member, the control lever, and the valve member, in which the latter is retained in active position by a yieldable detent means, and as the fluid motor moves, it stresses a spring and then as the motor reaches the desired position, the detent means is suddenly released, whereupon the spring quickly shifts the valve to its neutral or inactive position, thereby stopping the fluid motor accurately in the desired postion, without any wire drawing effect.

These and other objects and advantages of my invention will be apparent to those skilled in the art after a consideration of the following description, in which reference is had to the drawings appended hereto, in which Figure 1 is an elevational view of the hydraulic power mechanism, certain of the parts being broken away to show the details of construction;

Figure 2 is a side elevational view, part of which is shown in section as taken along a line 2—2 of Figure 1;

Figure 3 is a detailed view showing in elevation the differential connection between the driven member, the adjusting device, and the valve member;

Figure 4 is a sectional view taken along a line 4—4 in Figure 3 and drawn to an enlarged scale, showing one of the detent devices;

Figure 5 is a fragmentary elevational view showing one of the control arms;

Figure 6 is a fragmentary plan view of the mechanism with the top cover removed, showing the hydraulic pistons and cylinders;

Figure 7 is a side elevational view of the upper portion of the mechanism, showing the control handle;

Figure 8 is an elevational view of the control handles; and

Figure 1:
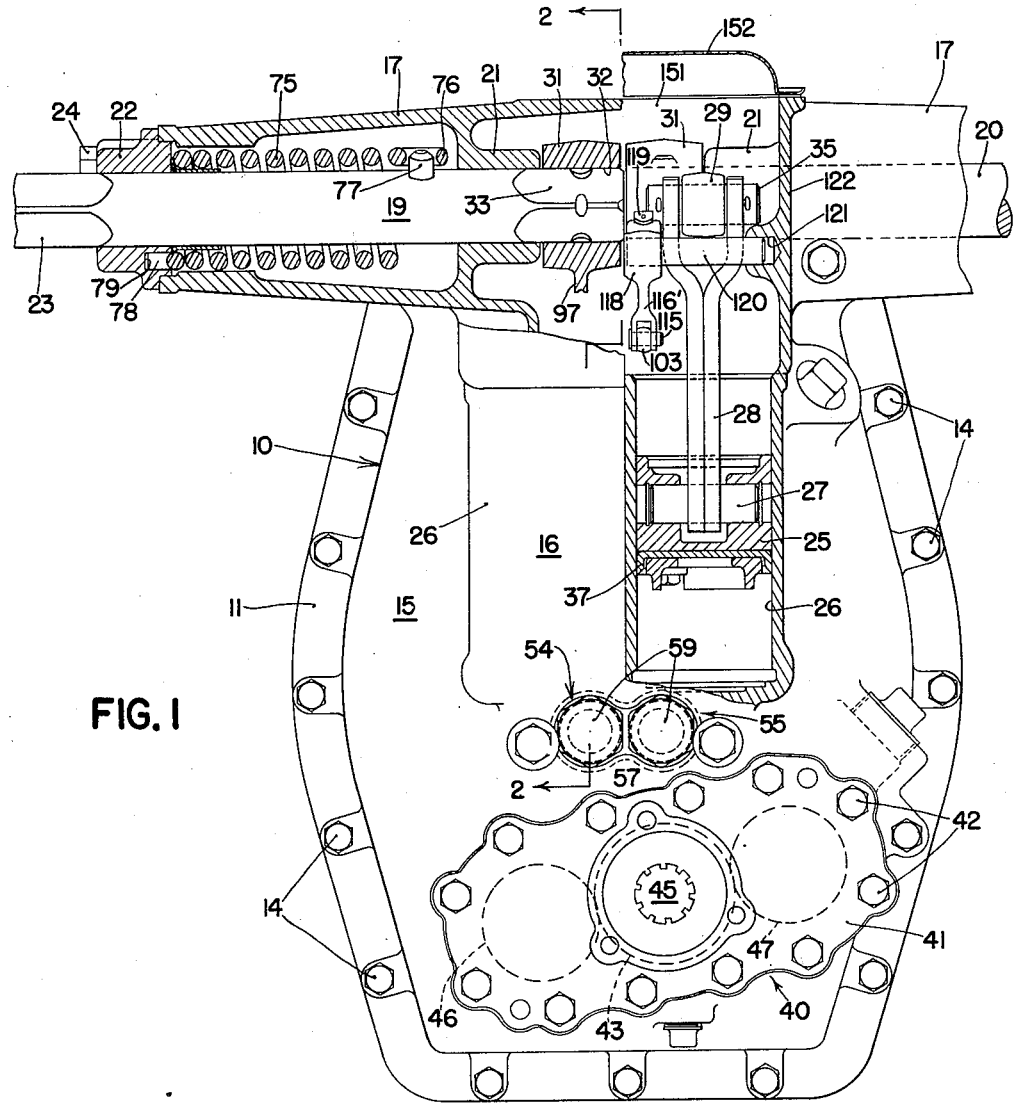

Referring now to the drawings, the hydraulic mechanism comprises a housing 10 having a flange 11 adapted to fit over the rear opening 12 in a banjo type rear axle housing 13 in a tractor and secured to the latter by bolts 14. This is a conventional position for a hydraulic power lift mechanism for tractors, as indicated by Patent 2,107,760, granted to applicant and others, jointly, February 8, 1938. The housing 10 comprises a cover portion 15 which covers the opening 12 in the axle housing, and formed integrally with the cover portion 15 and projecting rearwardly therefrom is a vertical cylinder portion 16, at the upper end of which is a pair of laterally extending quills 17. Beneath the quills 17 and forwardly of the cylinder portion 16, is a narrow control housing portion 18.

The power lift mechanism shown and described herein comprises two separate and independent hydraulic mechanisms for operating a pair of rockshafts 19, 20, disposed coaxially within the tubular housing sections or quills 17, respectively, with their inner ends in juxtaposition. As best indicated in Figure 1, each of the rockshafts is mounted adjacent its inner end in a journal bearing 21, preferably cast integrally with the tubular housing sections 17. The outer ends of the rockshafts are rotatably supported in bearing caps 22, which fit into the outer ends of the quills 17, respectively, and are secured by cap screws 24. The outer end of each of the rockshafts is squared, as indicated at 23 in Figure 1, for the purpose of receiving crank arms or the like for actuating implements associated with the tractor, as is well-known to those skilled in the art.

Each of the rockshafts 19, 20 is rocked by means of a fluid motor in the form of a hydraulic piston, 25, slidably disposed within a vertical cylinder 26 and connected by wristpin 27 to a connecting rod 28. Each connecting rod 28 comprises a pair of strap members disposed in juxtaposition, but which are spread apart at their upper ends to form a bifurcated connecting rod, to receive therebetween a bearing member 29 which is mounted on the end of a crank arm 30. The arm 30 is formed integrally with a sleeve 31 having a square aperture 32 to receive the squared inner end 33 of the associated rockshaft. The upper ends of the connecting rod 28 and the bearing member 29 on the end of the arm, 30, are provided with aligned apertures to receive a coupling pin 35 for connecting the piston 25 to the rockshaft, associated therewith.

Hydraulic fluid, such as oil, is admitted to each of the cylinders 26, through a port 36 in the lower end thereof, for raising the piston 25 upwardly and thereby the actuating arm 30, to rock the rockshaft in a clockwise direction as viewed in Figure 2. A cup-shaped leather seal 37 is mounted on the lower end of the piston 25 to hold the oil pressure within the cylinder 26 and prevent leakage upwardly between the piston and cylinder.

Figure 9:
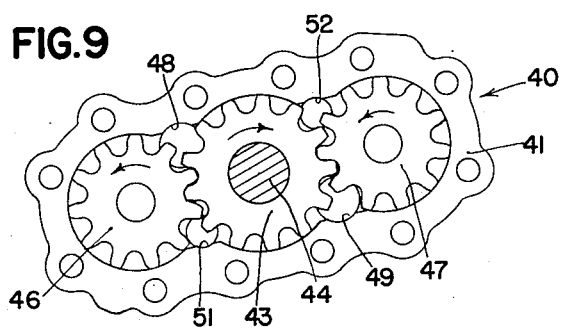
Figure 9 is an elevational view of the pump with its outer housing portion removed.

Oil is supplied under pressure to the cylinders by means of an oil pump indicated generally by reference numeral 40, which is of the constant displacement type and comprises a housing section 41 attached by bolts 42 to the lower portion of the main housing 10. Disposed within the pump housing 41 is a central gear 43 mounted on the power take-off shaft 44, which extends rearwardly from a connection (not shown) with the tractor engine, through the housing 10 and pump housing 41 and has a splined rear end portion 45 for transmitting power to implements associated with the tractor. A pair of pump gears 46, 47 mesh with the driving gear 43 and are disposed within the housing 40 on opposite sides of the driving gear 43. As indicated in Figure 9, the three pump gears 43, 46 and 47 serve as two independent gear pumps and are provided with two inlet ports 48, 49 communicating with the interior of the housing 10 which is adapted to serve as a reservoir 50. The inlet ports 48, 49 are arranged in diametrically opposite relation to the driving gear 43 adjacent the points of meshing of the driving gear 43 with the other two gears 46, 47. Similarly, a pair of discharge ducts 51, 52 are arranged in diametrically opposed relation and on the other side of the points of meshing of the gears. As is well-known to those skilled in the art, the oil is supplied to the gears through the inlet ports 48, 49 and is carried between the teeth of the gears and the housing, from the inlet ports to the discharge ports 51, 52. The discharge port 51 for the gears 43, 46 is connected to a high pressure supply duct 53 which is connected through a valve, indicated in its entirety by reference numeral 54, for supplying fluid under pressure to one of the cylinders 26, which is associated with the left hand rockshaft 19. The other discharge port 52 is connected through a similar supply duct (not shown), which supplies oil under pressure to the other cylinder 26 associated with the right hand rockshaft 20.

Each of the valves 54, 55 comprises a housing portion 56 cast integrally with the cylinder housing portion 16 and having an internal bore 57 extending therethrough. The outer end of the bore 57 is tapped at 58 to receive a plug 59. A cylindrical valve member 60 is slidable axially within the bore 57 and fits closely enough therein to prevent leakage of oil along the valve member within the bore, except where otherwise provided.

The cylinder port 36 is connected in communication with the bore 57, and the high pressure supply duct 53 is connected to the bore 57 through a port 61, spaced axially from the cylinder port 36. In Figure 2 the valve member is shown in neutral or inactive position, in which the cylinder port 36 is blocked by the valve member 60, preventing oil from flowing into or out of the cylinder 26 and thereby holding the piston 25 fixed within the cylinder. The valve member 60 has a portion 62 of reduced diameter, which in the inactive position of the valve, permits the oil to flow axially along the valve member 60 to a relief port 63 communicating with the reservoir 50. Thus, the implement associated with the tractor is normally held in any desired position of adjustment, while the gear pump 40 operates continuously, but at substantially no pressure since the oil is by-passed from the supply duct 53 to the reservoir 50 through the relief port 63.

The valve member 60 is yieldably secured in neutral position by means of a detent comprising a metal ball 65 engageable with an annular groove 66 around the valve member 60 near the inner end thereof. The ball 65 is urged into the groove 66 by means of a spring 67 which reacts against a plug 68 in an aperture 69 within which the ball 65 and spring 67 are disposed.

The piston 25 is raised in the cylinder 26 responsive to shifting of the valve member 60 to the left as viewed in Figure 2 until the end of the valve member 60 engages the plug 59. In this position of the valve member 60, the reduced portion 62 of the valve member extends between the supply duct port 61 and the cylinder port 36, interconnecting the two ports and thus permitting the oil to flow axially along the reduced portion 62 into the cylinder 26. At the same time, the relief port 63 is blocked by the valve member, thus permitting the pressure to build up until it is sufficient to raise the piston and the implement load on the rockshaft 19. The valve member 60 is retained in this active position by a peripheral groove 70 in the valve member adapted to receive the spring actuated detent ball 65, which yields when force is applied to shift the valve member back to the neutral position.

When the valve member 60 is shifted toward the right as viewed in Figure 2, until the valve member engages a snap ring 71 embedded in a suitable groove in the valve bore 57 adjacent the inner end thereof, the cylinder port 36 is connected in communication with a relief port 72 by means of a second portion of reduced diameter 73. The relief port 72 communicates with the reservoir 50 and thereby permits the oil from the cylinder to flow axially from the cylinder port 36 along the reduced section 73 and into the reservoir 50 through the port 72, thereby permitting the weight of the load on the rockshaft 19 to force the piston 25 downwardly in the cylinder 26. Each of the rockshafts 19, 20 is provided with a helical spring 75 coiled around the rockshaft and having a loop 76 at one end encircling a pin 77 fixed on the rockshaft, the other end 78 of the spring being bent outwardly to engage a recess 79 in the bearing cap 22. When the rockshaft is rocked to raise the load, the spring 75 is stressed in torsion and exerts a force against the rockshaft tending to return the latter to lowered position. When no load is connected to the rockshaft the force of the spring alone is sufficient to return the rockshaft to its initial position.

The valve member 60 is yieldably retained in its active lowering position by means of a third circumferential groove 80, which engages the spring actuated detent ball 65 when the valve member is shifted to the right as viewed in Figure 2.

A relief passage 81 connects the end of the bore 57 with the reservoir, to prevent pressure from building up at the end of the valve member 60.

The valve member 60 is shifted in the bore 57 through a valve rod 85 connected to the valve member 60 by a ball and socket joint 86 in the end of the valve member. A collar 87 encircles the rod 85 and is slidable thereon. The collar 87 is yieldably urged toward a neutral position thereon by means of a pair of helical compression springs 88, 89 which bear against opposite sides of the collar 87 in opposed relation, and are anchored to the rod at their other ends by means of a pair of washers 90 secured by cotter pins 91 against axial movement on the rod 85. The collar 87 is pivotally connected to a control element in the form of a lever 92 comprising a pair of juxtaposed bars secured together by rivets 93 but having outwardly offset lower ends 94 straddling the collar 87 and having aligned apertures adapted to receive a pair of trunnions 95 fixed to the collar 87. The upper ends of the bars forming the lever 92 are also offset outwardly at 96 to straddle a lug or ear 97 which is preferably formed integrally with the supporting hub or sleeve 31 for the crank arm 30. The offset ends 96 of the lever 92 and the ear 97 are provided with aligned apertures to receive a pivot pin 98, by means of which the upper end of the lever 92 is pivotally connected to the lug 97 and is thus pivotally mounted on the rockshaft 19 and is swingable therewith when the latter is rocked by the piston 25 moving in the cylinder.

The lever 92 is provided with a shiftable fulcrum in the form of a detent device indicated by reference numeral 100 and comprising a tubular casing 101 disposed between the offset ends 96 of the lever 92 and having a pair of oppositely extending trunnions 102 journaled in suitable aligned apertures in the offset portions 96 of the lever 92. The tubular casing 101 is carried on a control rod 103, which extends through aligned apertures 104 in the upper end of the casing 101 on an axis substantially perpendicular to the axis of the trunnions 102. The rod 103 is adapted to slide through the apertures 104, as best shown in Figure 4, but is yieldably retained in one position relative to the casing 101 by means of a detent ball 105 engageable with a recess 106 in the rod 103. The ball 105 is disposed within a cylindrical bore 107 within the casing 101 and is urged into engagement with the rod 103 by means of a helical compression spring 108. The rod 103 is prevented from pulling out of the aperture 104 in the casing 101 by means of a limit stop in the form of a washer 109 secured on the end of the rod 103 by means of a cotter pin 110. The opposite end of the rod 103 is pivotally connected by means of a pin 115 to a bifurcated lever arm 116.

The hydraulic mechanism and control described heretofore is provided in duplicate, there being a separate valve 54, 55 for each of the two cylinders, and a separate control lever 92, control rod 103, and associated connections, for each of the valves. The two control levers 92 are pivotally mounted on the lugs 97 on the two rockshaft arm supporting sleeves 31, respectively, and the rear ends of the two rods 103 are pivotally connected to the respective control arms 116, 116' disposed in side by side relation between the connecting rods 28. The control rods 103 are offset toward each other, as indicated at 117 in Figure 6. The arm 116' for the right hand valve 55 is formed with a hub 118, which is secured by a set screw 119 to a supporting shaft 120. As best indicated in Figures 1 and 6, the shaft 120 is journaled in a recess 121 formed in one wall 122 of the housing, while the other end of the shaft 120 is journaled in a hollow sleeve or shaft 123, which is rotatably supported in a bearing 124 in the opposite wall of the housing.

The other control arm 116 is formed integrally with a split hub 125 which is mounted on the inner end of the hollow sleeve or shaft 123 and is clamped securely thereon by means of a clamping bolt 126. The hollow shaft 123 extends outwardly of the housing through an annular oil seal 127. A hub 128 is fixed to the outer end of the hollow shaft 123 and carries a control lever 129 fixed to the hub 128. The shaft 120 extends through the sleeve 123 and extends outwardly beyond the latter to support a hub 130, which is rigidly fixed thereto by means of a set screw 131. A control lever 132 is rigidly fixed to the hub 130 in axially spaced relation to the control lever 129. The control levers 129, 132 can be independently shifted about the common axis of the two shafts 120, 123, to control the respective valve mechanisms 54, 55, in case it is desirable to control one or the other of the rockshafts 19, 20, independently of each other, or the two levers 129, 132 can be controlled together with one hand, to operate the two rockshafts 19, 20 as a unit.

The levers 129, 132 are secured in any position of adjustment by means of a pair of laterally spaced arcuate bars 135, the lower edges of which are provided with a series of notches 136 adapted to receive a locking dog 137 fixed to the side of each of the levers 129, 132. The arcuate bars 135 are supported on a pair of bolts 140 at opposite ends thereof, respectively, the bars 135 being spaced apart by means of collars 141 on the bolts 140. A third arcuate bar 142 extends between the bolts 140 between the two notched bars 135 and serves as a guide for the control levers 129, 132. Each of the levers 129, 132 is sufficiently flexible to permit it to be deflected by the operator away from its notched bar 135 to disengage the dog 137 from the latter, after which the lever can be freely shifted about the axis of the shafts 120, 123. The lever can be secured in any position of adjustment by merely releasing it, allowing it to spring back into engagement with its notched bar 135 as before. When both levers 129, 132 are to be adjusted together, the operator squeezes them together into engagement with opposite sides of the guide bar 142 whereby both dogs 137 are disengaged from the notches 136, permitting the levers to be shifted as a unit. The levers 129, 132 are provided with hemi-spherical handles 143, which can be squeezed together to form a spherical handle when the levers are adjusted as one. The bolts 140 are supported on a pair of bracket arms 145 extending upwardly from a bracket base 146 which is secured to the top of the housing by bolts 147. The extent to which the levers 129, 132 can be shifted in one direction, can be limited by means of a pair of adjustable clips 148, each of which is U-shaped and embraces one of the notched bars 135 and is secured in adjusted position by means of a bolt 149 having a thumb nut 150 cooperative therewith.

Access to the mechanism can be obtained through an opening 151 in the top of the housing, which is normally closed by a sheet metal cover 152 secured by bolts 153. This cover is removed in Figure 6 to show the mechanism within the housing. Another opening 155 is provided in the front wall of the housing 10, which is normally covered by a sheet metal enclosure 156 secured by bolts 157.

In operation, it will be noted that the control lever or link 92 is pivotally mounted for angular movement about three parallel axes, namely, the axes of the pivot pin 98, the trunnions 102, and the trunnions 95. Inasmuch as each of these axes is shiftable, it is evident that at certain times during operation, one of the axes serves as the fulcrum for the lever, while at other times during operation the other axes serve as fulcrums, respectively. The drawings show the manually adjustable control levers 129, 132 set substantially at the midpoint of their range, and the pistons are therefore disposed substantially midway in their range of movement within the cylinders, for in the class of hydraulic mechanism shown and described herein, the pistons automatically move to a position corresponding to any adjusted position of the control levers. Each of the valve members 60 is set in its neutral or inactive position with the detent ball 65 engaging the intermediate groove 66. The cylinder port 36 is blocked, to prevent oil from flowing into or out of the cylinder 26 and thereby locking the piston 25 in its adjusted position. The oil from the pump flows through the high pressure duct 53 into the valve bore 57 and escapes to the reservoir through the relief port 63, as described above.

To lower the piston 25 in the cylinder 26 to any lower position that is desired by the operator, thus moving the rockshaft in a counterclockwise direction as viewed in Figure 2 to lower the implements (not shown), the operator moves the control levers 129, 132, or either one separately, depending on whether both rockshafts are to be adjusted or either one independently, toward the right as viewed in Figure 7. Assume for example that the operator shifts the control lever 129 forwardly, or to the right as viewed in Figure 7, thereby rotating the hollow shaft 123 and swinging the control arm 116 in a counterclockwise direction as viewed in Figure 2. This shifts the rod 103 toward the right and exerts a force through the detent device 100, effecting an angular movement of the control lever 92 about the axis of the pivot pin 98, shifting the lower end of the lever 92 toward the right and compressing the coil spring 89 until the coils of the latter are compressed tightly together. Then, as the lever 92 continues its movement, the detent ball 65 is disengaged from the groove 66. The pressure of the spring 89 is not sufficient in itself to disengage the detent 65, but after the latter has been disengaged by pressure exerted by the operator through the compressed coils of the spring acting against the washer 90 and cotter pin 91 on the valve rod 85, the pressure of the spring 89 is sufficient to shift the valve member, causing the latter to move to its active position at the right hand end of the bore 57, in contact with the stop ring 71. This action all takes place within a very small movement of the control handle 129 because the trunnions 102 on the detent device 100 are mounted on the control lever 92 at a distance from the pivot pin 98 which is only about one-tenth of the distance from the pivot pin 98 to the connection between the lever 92 and the collar 87 at the lower end of the lever. During the remainder of the adjustment of the control lever 129, the collar 87 is again shifted to compress the spring 89, but since the valve member 60 is disposed in abutment with the stop ring 71, it can go no further in this direction, with the result that the lever 92 is prevented from any further movement in this direction, whereupon the force exerted by the operator upon the rod 103 disengages the recess 106 from the detent ball 105 in the detent casing 101, thereby permitting the rod 103 to slide freely through the opening 104 until the operator releases the control lever 129 and permits the dog 137 to engage one of the notches 136 in the lower edge of the arcuate bar 135.

As soon as the valve member 60 is shifted to its extreme position at the right hand end of the bore 57, the cylinder port 36 is uncovered by the valve member, allowing the oil to flow out of the cylinder 26 along the reduced portion 73 of the valve member and through the relief port 72 back to the reservoir 50. As the oil leaves the cylinder 26, the weight of the load on the rockshaft 19 and also the pressure of the spring 75 cause the rockshaft 19 to move in a counterclockwise direction about its axis. This swings the lug 97 toward the right as viewed in Figure 2 and shifts the control lever 92 therewith about the axis of the trunnion 95 at the lower end of the lever 92. As the piston 25 approaches its new position of adjustment toward the lower end of the cylinder 26, the detent device 100 is shifted with the lever 92 toward the right until the ball 105 seats once more in the recess 106. The trunnions 102 on the detent device 100, now become the fulcrum for the lever 92, so that further counterclockwise movement of the rockshaft 19 swings the lever 92 about the axis of the trunnions 102 in a clockwise direction, whereupon the lower end of the lever 92 shifts the collar 87 toward the left and compresses the spring 88 on the opposite side of the collar. The detent ball 65 is retained in the groove 80 by the pressure of the spring 67, however, until the coils of the spring 88 are compressed tightly against the washer 90 and cotter pin 91, after which further movement of the lever 92 about the axis of the trunnions 102 dislodges the ball 65 from the groove 80, whereupon the pressure of the spring 88 shifts the valve member 60 toward the left into its inactive position with the ball 65 engaging the groove 66. This stops the movement of the piston 25 in the cylinder 26 and the piston is once more locked in position by the valve member 60 which blocks the cylinder port 36.

It is evident that the detent device 100 must have a spring 108 which is strong enough to hold the detent ball 105 in the recess 106 to exert sufficient force therethrough to disengage the detent ball 65, and due consideration must be given to the mechanical advantage which the detent 65 has over the detent device 100 because of its longer lever arm. Preferably, the pressure of the compression spring 108 in the detent device 100 should be in the order of 25 lbs., while the pressure of the spring 67 against the detent ball 65 should be in the order of 27 ounces, and the maximum pressure of the springs 88 and 89 should be in the order of one lb. when the springs are collapsed. These values are given merely by way of example.

To raise the piston 25 and the cylinder 26, the control lever 129 is shifted toward the rockshaft, or in a counterclockwise direction as viewed in Figure 7. This shifts the control rod 103 toward the left as viewed in Figure 2, and initially acts through the detent device 100 and trunnions 102 to shift the control lever 92 clockwise about the axis of the pivot pin 98 as a fulcrum. Thus, the lower end of the lever 92 is shifted toward the left to compress the spring 88 between the collar 87 and the washer 90 until the coils of the spring 88 are solidly compressed, after which the force exerted through the lever 129 acts to disengage the detent ball 65 from the groove 66. The spring 88 then shifts the valve member 60 toward the left into contact with the plug 59 at the end of the valve bore 57, in which position the detent ball 65 engages the groove 70. Further movement of the control handle 129 shifts the control rod 103 toward the left, disengaging the detent device 100 and permitting the handle 129 to be set in any desired position of adjustment. In this position of the valve member 60, the oil flows through the port 61 and along the reduced portion 62 of the valve member, into the cylinder port 36. Simultaneously, the relief port 63 is blocked, as well as the relief port 72, thereby permitting the pressure to build up in the supply duct 53 and cylinder 26. Movement of the piston 25 upwardly in the cylinder, acting through the connecting rod 28 and arm 30, rotates the rockshaft 19 in a clockwise direction as viewed in Figure 2 and shifts the lug 97 and its fulcrum 98 toward the left until the detent device 100, sliding along the rod 103, brings the ball 105 into seating engagement in the recess 106. Continued movement of the rockshaft swings the lever 92 in a counterclockwise direction about the axis of the trunnions 102 as a fulcrum, moving the lower end of the lever 92 and the collar 87 outwardly along the valve stem 85 and thus compressing the spring 89. When the coils of the spring 89 are compressed tightly together, movement of the lever 92 disengages the detent ball 65 from the groove 70 and permits the spring 89 to shift the valve member back to inactive or neutral position, reconnecting the supply duct 53 with the relief port 63 and again blocking the cylinder port 36.

An adjustable stop in the form of a bolt 160 engaging a threaded aperture in a lug 161 which is preferably cast or otherwise formed on the inner side of each of the side walls 122 of the housing, is disposed in register with the control lever 92 and is adapted to be engaged thereby to serve as a fulcrum for the lever 92 at the upper end of the range of movement of the piston 25 in the cylinder 26, in case the detent device 100 should fail to operate properly. In such case, the lug 97 would swing the lever 92 about the axis of the trunnions 95 as a fulcrum, into engagement with the head of the bolt 160, after which further movement would swing the lever 92 to shift the valve member to neutral position. The bolt 160 can be adjusted toward or away from the lever by screwing it in its supporting lug 161 and can be locked in adjusted position by means of a lock nut 162.

A conventional emergency relief valve 163 is disposed in a relief port 164 in the side of the supply duct 53 and is urged into closed position within the port 164 by means of a strong compression spring 165, which is adapted to yield to an excess pressure within the supply duct 53 to prevent damage to the control mechanism or connection.

It will now be evident to those skilled in the art that the hydraulic system described above operates accurately and positively to open and close the valve so that the rockshaft is brought quickly to its desired position and stop at that position abruptly without any of the disadvantages usually encountered due to wire drawing in the valve.

A system of this type is especially well adapted for raising and lowering cultivating tools on a tractor when cultivating crops in rows which terminate along a line disposed at an acute angle to the rows. As the tractor approaches the end of the row, the cultivator rigs on one side are raised at the end of the adjacent row by swinging one of the control levers 129, 132 to raised position and then when the cultivator rigs on the opposite side of the tractor reach the end of the row they are raised by controlling the other control lever. Similarly, the cultivator rigs on one side of the tractor may be lowered when beginning a new row, the rigs on the other side following at the proper time, under independent control of the two levers 129, 132. When the desired cultivating depth is determined, the clip 148 can be adjusted to stop the associated control lever at this point so that the operator can always drop the cultivator tools to the same depth by moving the lever into engagement with the stop 148. When the rows terminate along a line perpendicular to the rows, the tools on both sides of the tractor can be raised and lowered simultaneously by squeezing the lever handles 143 together and shifting the two levers as a single unit.

I do not intend my invention to be limited to the exact details shown and described herein except as limited by the claims which follow.

I claim:

1. In combination, a power actuated motor, a member driven thereby, means for controlling said motor including a control member shiftable between at least two positions, releasable detent means for retaining said control member in one position, an adjustable control device including a lever securable in adjusted position, and means establishing a differential connection between said driven member, said control member, and said control lever, said last named means including spring means connected between said members and adapted to be stressed by force applied through said connection to shift said control member out of engagement with said detent means and releasable means connecting said members with said lever for transmitting force applied through the latter to shift said control member to said one position, thereby starting said motor, further movement of said lever acting to disengage said releasable connecting means and to move the lever to a selected position for predetermining the extent of movement of said motor, said differential connecting means being shifted by said driven part to re-engage said releasable connecting means on said control device, subsequent movement of said driven part acting to stress said spring means and shift said control member out of engagement with said detent means, the energy stored in said spring means being sufficient to shift the control member to said other position to disable said motor after disengagement of said detent means.

2. In combination, a fluid pressure actuated motor, a member driven thereby, a control valve having a valve member shiftable between active and inactive positions for controlling said motor, a control device including an adjustable member securable in adjusted position, a control element pivotally connected with said valve member, said control device, and said driven member for relative angular movement about parallel axes, the connection between said control element and said adjustable member including a pair of separable parts and a detent device releasably coupling said parts together, whereby said valve member can be shifted from said inactive position to said active position by force applied to said element through said adjustable member while said pivot connection with said driven member serves as a fulcrum, said valve member having stop means preventing movement thereof past said active position effecting release of said device to uncouple said parts to permit free movement of said adjustable member to a selected position, the movement of said driven member being in the proper direction to first recouple said separable parts and then to swing said element about said pivot connection with said adjustable member as a fulcrum, thereby shifting said valve member toward said inactive position to stop said motor.

3. In a hydraulic power mechanism, a cylinder, a piston slidable therein, a rockshaft connected to said piston to be rocked thereby, a control valve for controlling fluid for actuating said piston, said valve including a valve member shiftable between active and inactive positions to control the movement of said piston in said cylinder, a control element comprising a lever swingably connected at one end with said valve member and pivotally connected to said rockshaft, shiftable fulcrum means for said lever including a detent device pivotally mounted on said lever and a cooperative part slidably mounted on said device, said part being engaged by said detent device in one position relative thereto providing for transmitting a force therebetween sufficient to swing said lever about its connection with said rockshaft to shift said valve member from inactive to active position to start said motor, stop means for preventing the shifting of said valve member beyond said active position whereby further application of force to said part disengages the latter from said detent device, and means securing said part in adjusted position whereby said rockshaft swings said lever about its connection with said valve member to reengage said detent device, after which further movement of said rockshaft pivots said lever about said fulcrum means to shift said valve member back to said inactive position.

4. In a hydraulic power mechanism, a cylinder, a piston slidable therein, a rockshaft connected to said piston to be rocked thereby, a control valve for controlling fluid for actuating said piston, said valve including a valve member shiftable between active and inactive positions to control the movement of said piston in said cylinder, a yieldable detent means for normally retaining said valve member in each of said positions, a control element comprising a lever, a double acting spring means connecting one end of said lever with said valve member to transmit force therebetween to shift said valve member in either direction, means limiting the extent of movement of said lever relative to said valve member in each direction, said spring means having insufficient strength to disengage said yieldable detent means but capable of shifting said valve member between said positions after said detent means is disengaged, means pivotally connecting the other end of said lever with said rockshaft whereby angular movement of the latter swings said lever, shiftable fulcrum means for said lever including a detent device pivotally mounted on said lever and a cooperative part slidably mounted on said device, said part being engaged by said detent device in one position relative thereto providing for transmitting a force therebetween sufficient to swing said lever about its connection with said rockshaft to stress said spring means to said limited extent of relative movement and disengage said yieldable detent means thereby permitting said spring means to shift said valve member to said active position to start said motor, stop means for preventing the shifting of said valve member beyond said active position whereby further application of force to said part disengages the latter from said detent device, and means securing said part in adjusted position whereby said rockshaft swings said lever about its connection with said valve member to reengage said detent device, after which further movement of said rockshaft pivots said lever about said fulcrum means to stress said spring means to said limited extent of relative movement and disengage said yieldable detent means, thereby permitting said spring means to shift said valve member to said inactive position to stop said motor.

5. In a hydraulic power mechanism, a cylinder, a piston slidable therein, a rockshaft connected to said piston to be rocked thereby, a control valve for controlling fluid for actuating said piston, said valve including a valve member shiftable from a neutral or inactive position in either direction to active position to control the movement of said piston in opposite directions in said cylinder, selectively, a yieldable detent means for normally retaining said valve member in each of said positions, a control element comprising a lever, a collar pivotally mounted at one end of said lever, a rod slidable within said collar and attached to said valve member, and a pair of helical compression springs disposed coaxially of said rod on opposite sides of said collar and bearing upon the latter in opposed relation, said springs being anchored to said rod and having insufficient strength to disengage said yieldable detent means but capable of shifting said valve member between adjacent positions of the latter after said detent means has been overcome by force exerted through said lever and one of the springs after the latter has been collapsed, means swingably connecting the other end of said lever with said rockshaft whereby angular movement of the latter swings said lever, shiftable fulcrum means for said lever including a detent device pivotally mounted on said lever and a rod slidably mounted on said device, said rod being engaged by said detent device in one position relative thereto providing for transmitting a force therebetween sufficient to swing said lever about its connection with said rockshaft to collapse one of said springs and disengage said detent means thereby permitting said spring means to shift said valve member to the selected active position to start said motor, stop means for preventing shifting of said valve member beyond either of said active positions whereby further application of force to said rod disengages the latter from said detent device, and means securing said rod in adjusted position whereby said rockshaft swings said lever about its pivotal connection with said collar to reengage said detent device, after which, further movement of said rockshaft pivots said lever about said fulcrum means to compress the spring to collapsed position to disengage said yieldable detent means thereby permitting said spring to shift said valve member to said neutral position to stop said motor 6. In combination, a power actuated motor, a member driven thereby, means for controlling the motor including a control member shiftable between active and inactive positions, first detent means for retaining the control member in each of said positions, means for transmitting force from the driven member to shift the control member from its active position to its inactive position comprising a control element connected with one of said members, and double acting spring means connecting the control element with the other of said members and adapted to be stressed by force applied thereto through the control element against the resistance of the first detent means, the energy thus stored in said spring means being sufficient, after disengagement of said first detent means, to shift the control member between its positions, a control device including a lever, means for securing the lever in adjusted position, and second detent means connecting the lever and the control element so that said lever is normally operative to shift the control element about its connection with the driven member as a fulcrum to effect shifting of the control member from its inactive position to its active position to start said motor, and a fixed stop against which the control member bears in its active position, said control member being shifted by said lever to active position against said stop, after which continued movement of said lever disengages the second detent means to provide for free movement of the lever to a position predetermining the extent of movement of said motor, said control element being movable by said driven member into reengagement with the second detent means, said second detent means serving as a fulcrum against which said element reacts to effect reshifting of the control member.

7. In combination, a fluid pressure actuated motor, a member driven thereby, a control valve having a valve member shiftable between active and inactive positions for controlling said motor, releasable detent means for retaining said valve member in said active position, a control device including an adjustable member, means securing said member in adjusted position, a control element pivotally connected with said valve member, said control device, and said driven member for swinging movement about any of a plurality of parallel axes, whereby said valve member can be shifted between said positions by force applied to said element through said pivot connection with said adjustable member while said pivot connection with said driven member serves as a fulcrum, or by force applied to said element by said driven member while said pivot connection with said adjustable member serves as a fulcrum, at least one of said pivot connections comprising a collar pivoted on said control element, a connecting rod attached to the associated member and adapted to slidably receive said collar, and a helical spring encircling said rod and bearing against said collar, the other end of said spring being anchored to said rod, said spring being yieldable when force is applied therethrough to shift said valve member out of said active position against the resistance of said detent means, and means for limiting the extent to which said spring yields to cause said applied force to overcome said detent means, the energy being thus stored in said spring being sufficient to shift said valve member to inactive position after release from the detent means.

8. In combination, a fluid pressure actuated motor, a member driven thereby, a control valve for controlling said motor and having a valve member shiftable from a neutral or inactive position in either of two opposite directions to active positions, to control the movement of said motor in either direction, selectively, releasable detent means for retaining said valve member in either of said active positions, a control device, means securing said member in adjusted position, a control element pivotally connected with said valve member, said control device, and said driven member for swinging movement about any of a plurality of parallel axes, whereby said valve member can be shifted between said positions by force applied to said element through said pivot connection with said adjustable member while said pivot connection with said driven member serves as a fulcrum, or by force applied to said element by said driven member while said pivot connection with said adjustable member serves as a fulcrum, at least one of said pivot connections comprising a collar pivoted on said control element, a connecting rod attached to the associated member and adapted to slidably receive said collar, and a pair of helical springs encircling said rod and bearing against opposite ends of said collar, respectively, the other ends of said springs being anchored to said rod, said spring being yieldable when force is applied therethrough to shift said valve member out of either of said valve positions against the resistance of said detent means and means for limiting the extent to which said spring yields to cause said applied force to overcome said detent means, the energy thus stored in said spring being sufficient to shift said valve member to inactive position after release from the detent means.

WAYNE H. WORTHINGTON.

REFERENCES CITED

The following references are of record in the file of this patent:

UNITED STATES PATENTS

| Number | Name | Date |
|---|---|---|
| 949,559 | Wilson | Feb. 15, 1910 |
| 1,339,939 | Alter | May 11, 1920 |
| 1,654,673 | Barks | Jan. 3, 1928 |
| 2,047,922 | Seligmann | July 14, 1936 |
| 2,072,410 | Shannon | Mar. 2, 1937 |
| 2,114,157 | Towson | Apr. 12, 1938 |
| 2,136,751 | Nampa | Nov. 15, 1938 |
| 2,203,296 | Fleischel | June 4, 1940 |

Certificate of Correction

Patent No. 2,511,393                                                        June 13, 1950

WAYNE H. WORTHINGTON

It is hereby certified that errors appear in the printed specification of the above numbered patent requiring correction as follows:

Column 11, line 34, before the word "device" insert *detent*; column 12, line 7, for "lever, a double" read *lever, double*;

and that the said Letters Patent should be read with these corrections therein that the same may conform to the record of the case in the Patent Office.

Signed and sealed this 26th day of September, A. D. 1950.

[SEAL]

THOMAS F. MURPHY,
*Assistant Commissioner of Patents.*